L. WEAVER.
Hand Seeder.
No. 69,876.
Patented Oct. 15, 1867.
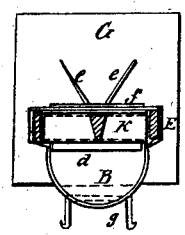
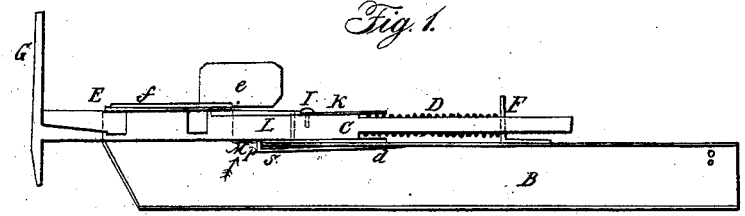
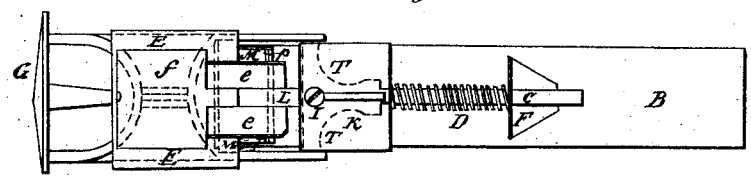
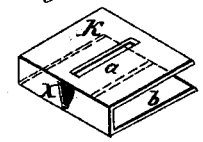
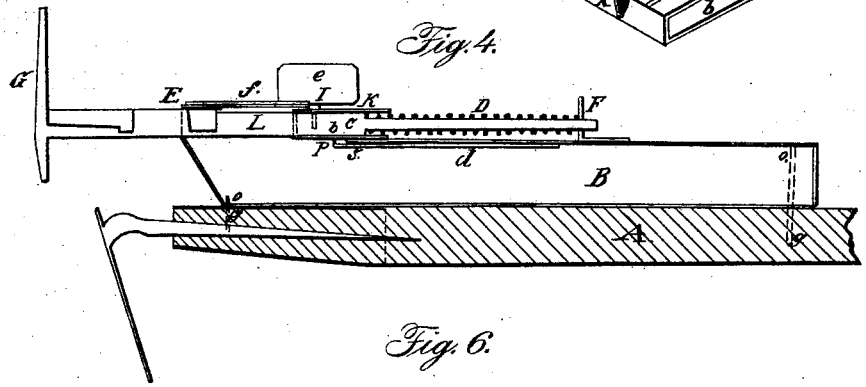
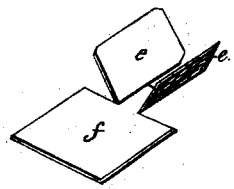
Witnesses:
Inventor:

United States Patent Office.

LEWIS WEAVER, OF CANTON, OHIO.

Letters Patent No. 69,876, dated October 15, 1867.

---

CORN-DROPPERS.

---

The Schedule referred to in these Letters Patent and making part of the same.

---

TO ALL WHOM IT MAY CONCERN:

Be it known that I, LEWIS WEAVER, of Canton, in the county of Stark, and State of Ohio, have invented new and useful Improvements in Corn-Droppers; and I do hereby declare that the following is a full, clear, and exact description thereof, reference being had to the accompanying drawings, and to the letters of reference marked thereon, of which—

Figure 1 is a longitudinal section of corn-dropper.

Figure 2 is a cross-section of the same.

Figure 3 is a plan of corn-dropper.

Figure 4 is another longitudinal section, showing the valve-standard in another position.

Figure 5 is a perspective of the improved valve, and

Figure 6 is a perspective of separating-flanges, showing their manner of attachment.

The nature of my invention consists, first, in the attachment of two separating-flanges, so arranged with reference to the separating-bar in the valve-standard as that the kernels of corn, or other grain to be dropped, shall be separated more fully from each other, and caused to fall on the ground in separate positions in a proper position for covering; second, in the use of a spring, so arranged in the hopper of the dropper as that the kernels of grain shall not be injured by the upward movement of the valve-standard; and lastly, in so constructing the valve as that it shall serve as an aid to the spring in more fully protecting the kernels of grain from injury.

To enable others skilled in the art to make and use my invention I will proceed to describe its construction and operation.

B is the hopper, made of tin or other suitable material, which is attached to the handle A of the hoe by the wires $g$ $g$ passing through the holes $o$ $o$ in the hopper, or in any other suitable manner. To the hopper B is attached the valve-standard C by means of the pieces F and E, which serve as boxes or slides through which the valve-standard moves. The valve-standard is kept in position by means of the spring D, as shown. To the valve-standard is attached the valve K by means of the screw I, as shown, so that by changing the relative positions of the valve K and foot G, the quantity of seed discharged may be altered at pleasure. With the valve-standard C in position, as shown figs. 1 and 3, the grain passes out through the opening M, as shown by arrow. When the valve-standard takes the position shown in fig. 4, the valve K covers the hole M, so that no seed can pass out.

My invention consists, first, in attaching the piece $f$, having the separate flanges $e$ $e$, to the top of the box E, in such a manner as that the seeds which are separated by the separating-bar L shall be still further separated, so as to exclude the possibility of their falling to the ground in the same place.

My invention consists, secondly, in attaching a spring, $d$, having a lip, $p$, at one end, to the body of the hopper B, so that when the valve-standard is pushed back into the position shown in figs. 1 and 3, the kernels of corn cannot come against the edge S of the hopper, whereby they formerly were often split and rendered unfit for seed.

My invention consists, thirdly, in constructing a valve, K, as shown in fig. 5, having a hole, X, as shown for the separating-bar L, and the lower part being made in two parts $a$ and $b$, in order to allow of its being put around the bar L, in position as shown in figs. 1 and 4. It will be seen that the parts $a$ and $b$, pressing on the lip $p$ of the spring $d$, prevent any seed from getting into the places T T, below the upper part of the valve K, where they would impede or prevent the proper action of the valve-standard.

I do not claim as my invention the hopper B, valve-standard C, spring D, foot G, or boxes or slides E and F, but what I do claim as my invention and desire to secure by Letters Patent, is—

1. The piece $f$ having flanges $e$ $e$ thereon, attached to the box E in the manner and for the purpose specified.

2. The spring $d$, having the lip $p$ thereon, and attached to the hopper B in the manner and for the purpose specified.

3. The valve K, having the hole X therein, and the lower parts $a$ and $b$ arranged in the manner and for the purpose specified.

As evidence that I claim the foregoing, I have hereunto set my hand in presence of two witnesses.

LEWIS WEAVER.

Witnesses:
JACOB SCHWARTZ,
E. N. BEEBOUT.